United States Patent [19]

Hirahara et al.

[11] Patent Number: 5,732,787
[45] Date of Patent: Mar. 31, 1998

[54] CONTROL DEVICE OF A START-ASSIST SYSTEM

[75] Inventors: Hideto Hirahara; Masaaki Kano; Minori Higuchi; Haruyuki Hosoya, all of Kawasaki, Japan

[73] Assignee: Isuzu Motors, Ltd., Tokyo, Japan

[21] Appl. No.: 617,637

[22] Filed: Mar. 19, 1996

[51] Int. Cl.$^6$ .................................................. B62D 61/10
[52] U.S. Cl. .................................. 180/24.02; 180/24.13; 280/678
[58] Field of Search ................................. 280/678, 680, 280/683, 685, 711, 6.1, 405.1; 180/24.02, 24.13

[56] References Cited

U.S. PATENT DOCUMENTS

| | | | |
|---|---|---|---|
| 4,854,409 | 8/1989 | Hillebrand | 180/24.02 |
| 4,993,729 | 2/1991 | Payne | 180/24.02 |
| 5,286,059 | 2/1994 | Tabe | 280/840 |
| 5,364,122 | 11/1994 | Ichimaru | 280/709 |
| 5,522,469 | 6/1996 | Hosoya | 180/24.02 |

*Primary Examiner*—Brian L. Johnson
*Assistant Examiner*—Jonathan E. Butts
*Attorney, Agent, or Firm*—Antonelli, Terry, Stout, & Kraus, LLP

[57] ABSTRACT

A start-assist system provided in a vehicle having two rear axles, one of which is a drive axle. A control device includes an air actuator attached to the drive axle; a level sensor for detecting loads applied to the axles; an air supply source for supplying compressed air to the air actuator; a first valve disposed in an air conduit for supplying air to the air actuator; a second valve for releasing air from the air actuator; and a controller for controlling the first valve and the second valve. The controller opens the first valve to introduce air to the air actuator when a signal from the level sensor indicates that the vehicle is stopped and is unladen, opens the second valve to release air from the air actuator when the signal from the level sensor indicates that the vehicle is stopped and is laden.

3 Claims, 12 Drawing Sheets

CONTROL DEVICE OF A START-ASSIST SYSTEM

BACKGROUND OF THE INVENTION

1. Field of the Invention

This invention relates to a control device of a start assist system installed in a vehicle of a type having two rear axles.

2. Description of the Prior Art

Figure 10:
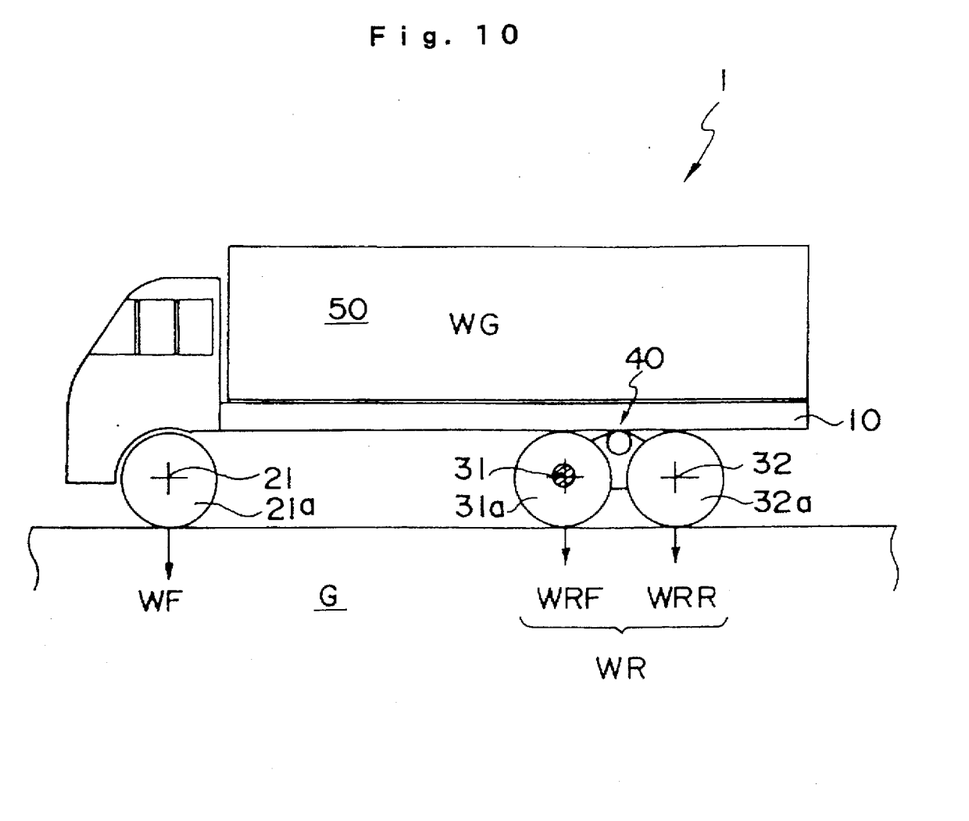
FIG. 10 is an explanatory view showing a vehicle having two rear axles.

FIG. 10 is a schematic explanatory view of a vehicle having two rear axles. A large vehicle, labelled 1, has a front axle 21 mounted in a front location of a frame 10 to support front wheels 21a. The vehicle 1 has two rear axles 31 and 32 which support wheels 31a and wheels 32a.

These two rear axles 31, 21 are supported by the frame 10 via a suspension 40, and the frame 10 supports cargo 50 thereon.

The whole weight WG of the vehicle 1 including the cargo 50 is divided into a load WF applied to the front wheels 21a and a load WR applied to the rear wheels 31a and 32a, and the ground G bears both these loads WF and WR.

Since the vehicle 1 has two axles 31 and 32 in the rear, the load WR applied the entirety of the rear of the vehicle 1 is divided into a load WRF supported by the rear-front shaft 31 and a load WRR supported by the rear-rear shaft 32. By limiting the maximum possible load applied to a single axle in this manner, vehicles for larger loads can be constructed.

Among various vehicles having two rear axles, so-called 6×2 vehicles have been developed, in which the power transmission system is simplified by using the rear-front axle 31 as a drive axle for receiving the drive force from the engine and using rear-rear axle 32 as an idler axle which does not receive the drive force.

In these 6×2 vehicles, the drive wheels 31a must generate a sufficient propulsive force. In this connection, the load WRF applied to the wheels 31a must be large enough to generate a sufficient propulsive force between the wheel 31a and the ground G.

When the vehicle is laden, the load WRF applied to the drive axle 31 is large enough to generate a sufficient propulsive force at the wheels 31a.

However, when the vehicle 1 is unladen, the load WRF to the drive axle 31 may be too small, and the wheels 31a may fail to produce a sufficient propulsive force against the ground G. In particular, when the vehicle is going to start moving on a ground surface having a small friction coefficient, the vehicle often fails to start successfully due to slippage of the wheels 31a.

The present Applicant previously proposed a start assist system for use in a vehicle configured to drive one of two rear axles, as described in Japanese Patent Application No. 6-30087.

The invention of the above application uses an air actuator for adjusting the load to the drive axle and a level sensor for detecting a change in load to axles and for controlling behaviors of the air actuator, in order to increase the driving force exerted when the vehicle starts to move.

The use of this system certainly increases the traction produced by the drive wheels upon a starting run of the vehicle and improves the starting performance of the vehicle.

The above start-assist system also improves the running efficiency of a vehicle on ascending slopes and the braking reliability on slopes.

The above start-assist system works well when the vehicle is unladen. However, if the start-assist system is activated when the vehicle is laden, where a load large enough to produce a sufficient traction is applied to two rear axles, then an additional load is applied to the drive axle. Such a large load reduces the life of the axle and precipitates abrasion of the drive wheels.

OBJECTS AND SUMMARY OF THE INVENTION

It is therefore an object of the invention to provide a control device of a start-assist system overcoming the above-indicated disadvantages.

According to a first aspect of the invention, there is provided a control device in a start-assist system equipped in a vehicle having two rear axles one of which is a drive axle, and including an air actuator attached to the drive axle, in which the control device comprises a speed sensor for detecting the running speed of the vehicle; a level sensor for detecting loads applied to the axles; an air supply source for supplying compressed air to the air actuator; a first valve disposed in an air conduit for supplying air to the air actuator; a second valve for releasing air from the air actuator; and control means for controlling the first valve and the second valve.

The control means opens the first valve to introduce air to the air actuator upon detecting that the vehicle is unladen when it is stopped, and opens the second valve to release air from the air actuator when the speed of the vehicle is above a predetermined value or when the vehicle is laden when it is stopped.

According to a second aspect of the invention, there is provided a control device in a start-assist system provided in a vehicle having two rear axles, one of which is a drive axle, and including an air actuator attached to the drive axle, in which the control device comprises a level sensor for detecting loads applied to the axles; an air supply source for supplying compressed air to the air actuator; a first valve disposed in an air conduit for supplying air to the air actuator; a second valve for releasing air from the air actuator; and control means for controlling the first valve and the second valve.

The control means opens the first valve to introduce air to the air actuator when a signal from the level sensor indicates that the vehicle is stopped and is unladen, and opens the second valve to release air from the air actuator when the signal from the level sensor indicates that the vehicle is stopped and is laden.

DETAILED DESCRIPTION OF THE PREFERRED EMBODIMENTS

Figure 4:
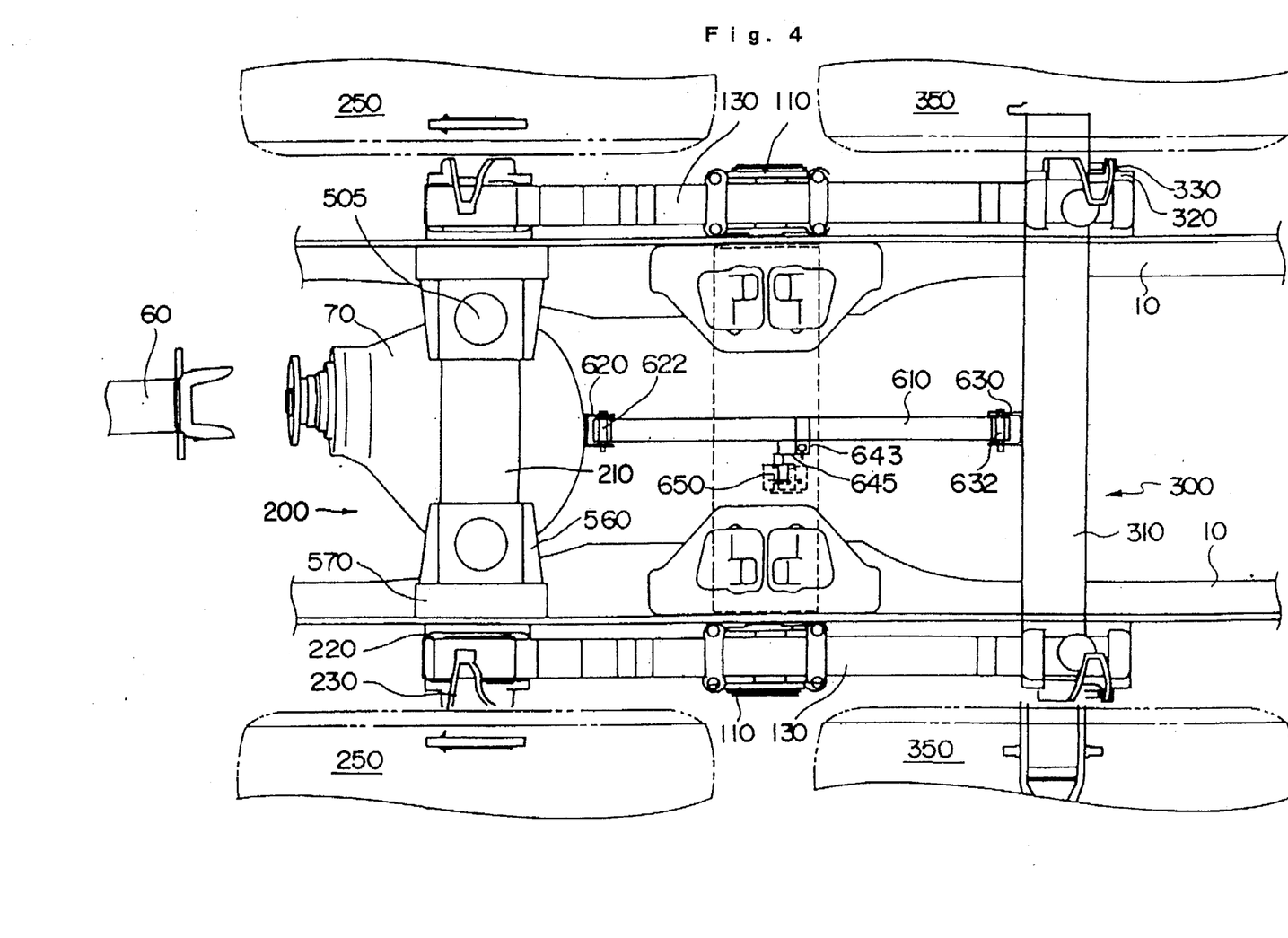
FIG. 4 is a plan view of a vehicle equipped with a start-assist system.
Figure 5:
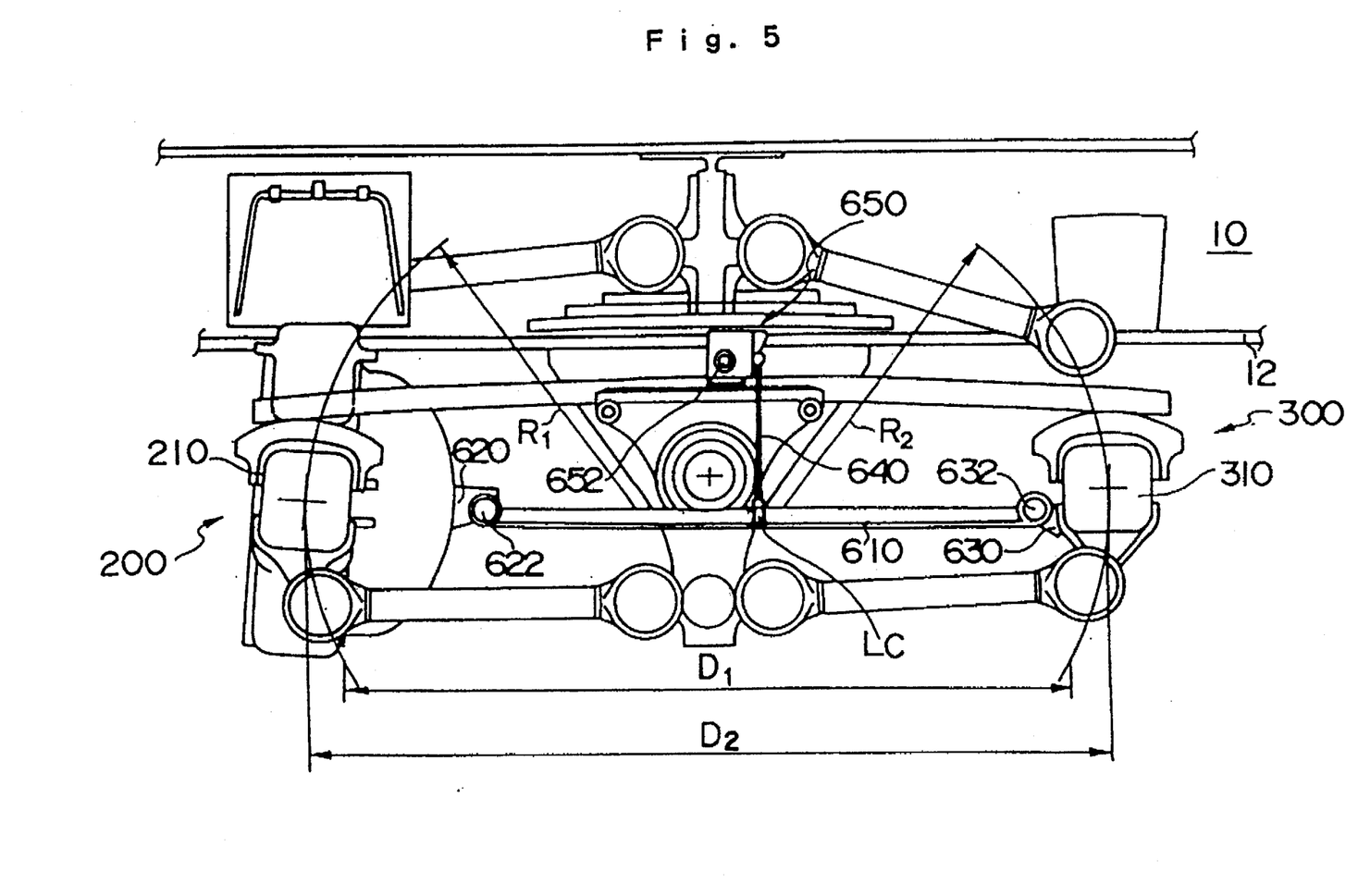
FIG. 5 is a side elevation of the vehicle of FIG. 4.
Figure 6:
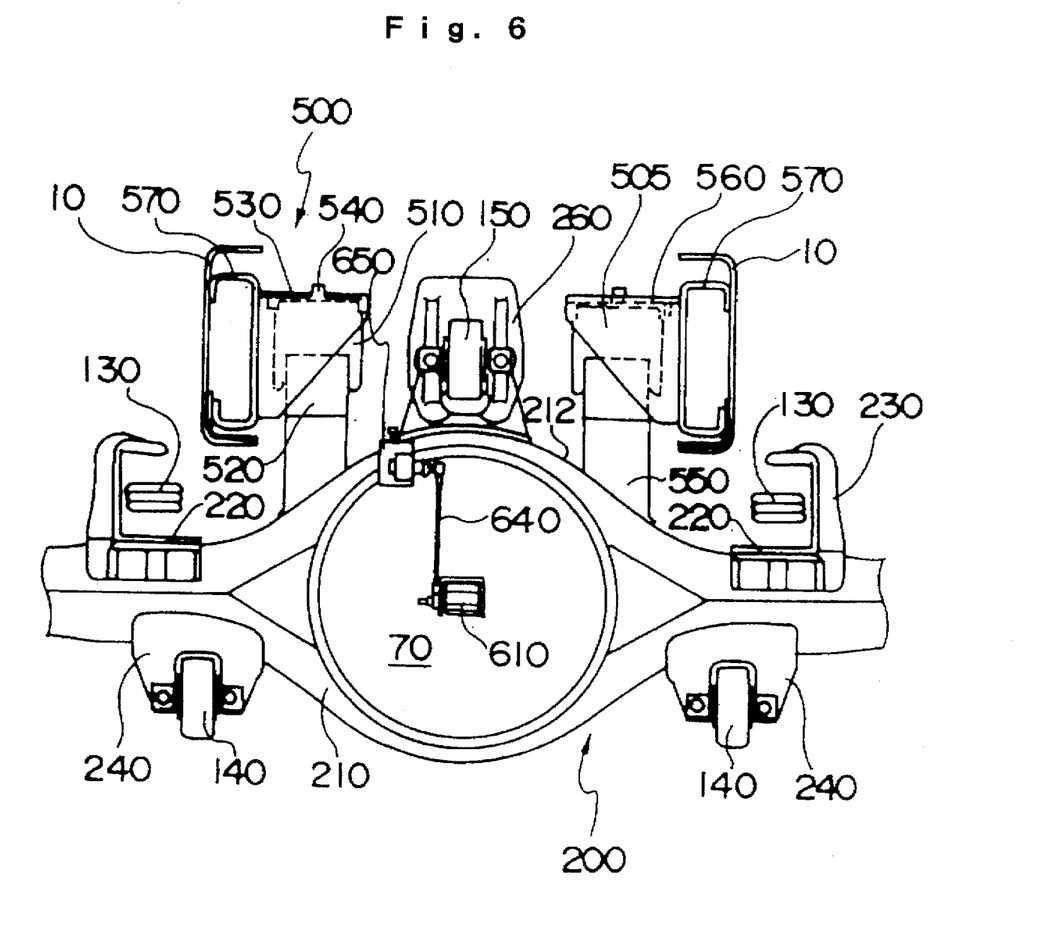
FIG. 6 is a front elevation of a drive axle.
Figure 7:
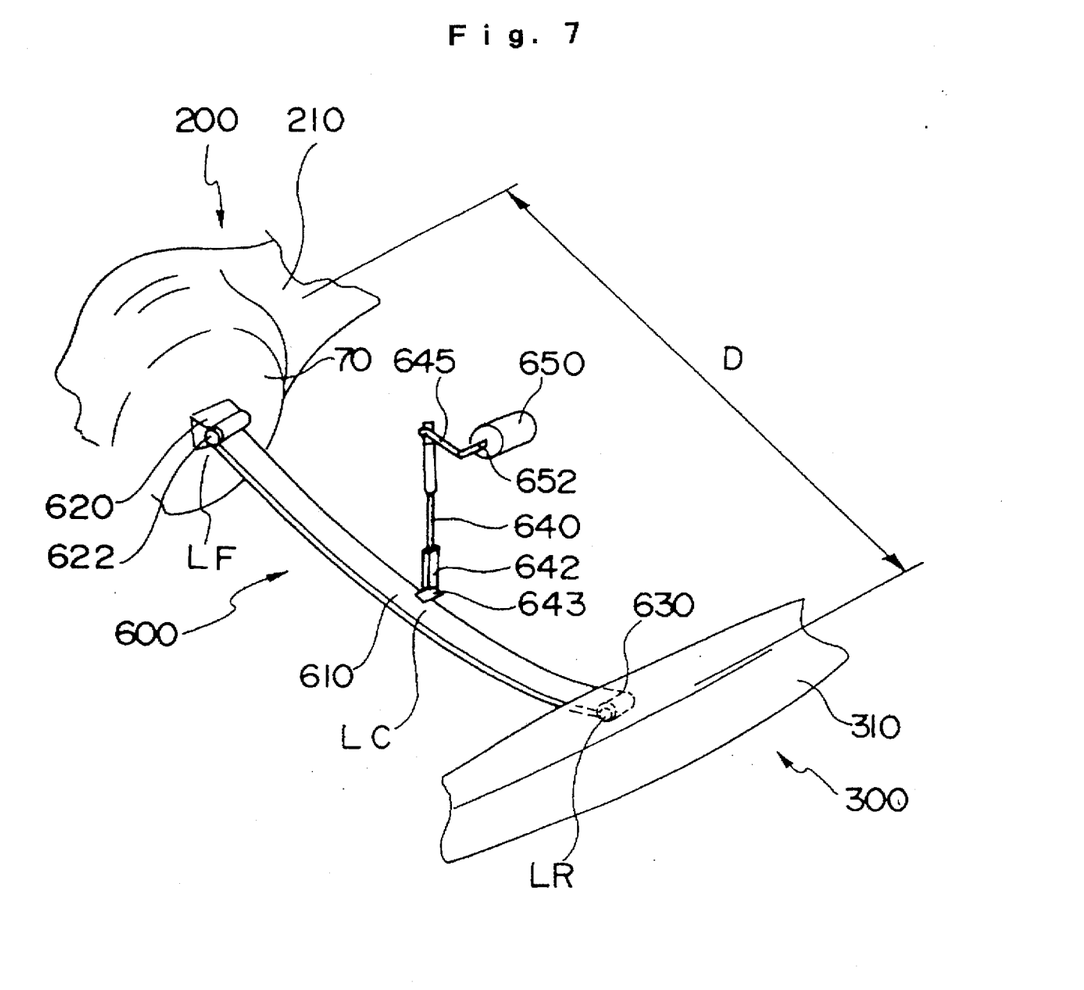
FIG. 7 is an explanatory view of a load detector.

FIG. 4 is a fragmentary plan view of a vehicle equipped with a start-assist system to which the invention is applied. FIG. 5 shows a construction of a trunnion suspension equipped with the start-assist system according to the invention. FIG. 6 is a fragmentary front elevation of a drive axle and its peripheral elements. FIG. 7 is an explanatory view of a load detector used in the invention.

With reference to FIGS. 4 to 6, the start-assist system is equipped in the vehicle having the trunnion suspension to increase the drive force required when the vehicle starts to run.

The vehicle has a frame 10 disposed at right and left sides of the vehicle body to support a drive axle 200 and an idler shaft 300.

An engine disposed at a front portion of the vehicle and a propeller axle 60 coupled to a gear box transmit power to a differential gear mechanism contained in a differential gear case 70 which is integral with the drive axle 200. The trunnion suspension has trunnion brackets 110 fixed on the lower surface of the frame 10. Each trunnion bracket 110 rotatably supports a trunnion axle which in turn supports a central portion of a leaf spring 130.

The leaf spring 130 is a laminated plate member made by stacking up to ten leaf springs.

The drive axle 200 is a unit including a axle member, rotatably contained in a cylindrical housing 210, and supporting drive wheels 250 at opposite ends. In general, the drive wheels 250 are two at each end of the drive axle, and so four in total.

Provided on the housing 210 of the drive axle 200 is a sliding sheet 220 which receives one end of the leaf spring 130. The leaf spring exerts a resilient force for urging the drive axle 200 toward the ground. Spring pressers 230 are provided at opposite ends of the sliding sheet 220.

A first torque rod 140 is attached to the lower surface of the drive axle housing 210 via a bracket 240. The first torque rod is coupled to a second torque rod through a coupling member extending through the trunnion bracket 110.

The idler axle 300 does not directly receive the driving force from the engine but rotatably supports idler wheels 350. In general, there are two idler wheels 350 at each end of the idler axle 300, and so four in total; however, there may be only one at each end.

A central portion of the drive axle housing 210 projects upward and downward for containing the differential gear case 70. A bracket 260 is mounted on the top of the upper projecting portion to which a third torque rod 150 is coupled.

With the above-explained construction of the trunnion suspension, any appropriate ratio of loads distributed to both shafts can be selected by appropriately determining the distance between the center of the trunnion shaft and the center of the drive axle 200 and the distance between the center of the trunnion shaft and the center of the idler axle 300. The drive axle 200 and the idler axle 300 can move along circular orbits of radii R1 an R2, respectively, and the distance D between the two axles varies between D2 and D1.

A start-assist system to which the invention is applied is mounted on the drive axle 200.

A start-assist system, labelled 500, includes an air actuator 505 and its mounting structure. The air actuator 505 comprises a diaphragm 510, piston member 520 disposed under the diaphragm 510, and upper plate 530 disposed on the diaphragm 510. A lower portion of the diaphragm 510 is attached to a bracket on the side of the drive axle. An upper portion of the diaphragm 510 is attached to a bracket on the part of the frame.

Used as the vehicle frame 10 is a channel material having a channel-shaped cross section, for example. An attachment member 570 of the frame-side bracket is fixed to the inner side of the frame 10. A bracket 560 opening downward is integrally mounted to the attachment member 570, and securely contains the upper plate 530 of the air actuator 505 inside. An air inlet 540 of the air actuator 505 projects upward passing through the bracket 560.

The air inlet 540 is connected to a compressed air source through an air supply pipe which will be explained later. Since large vehicles, in general, are equipped with an air compressor and a high-pressure tank for assisting clutching and braking actions, this source of the compressed air can be utilized for this purpose.

Under the condition with no compressed air introduced to the air actuator 505, the drive axle 200 and the idler axle 300 receive loads of a ratio equal to that in an ordinary trunnion suspension.

When compressed air is introduced into the air actuator 505, the diaphragm 510 expands and biases the drive axle 200 toward the ground. This biasing force increases the load applied to the drive wheels 250 and hence increases the propulsive force produced between the drive wheels 250 and the ground.

Therefore, if the start-assist system is activated when the vehicle starts to run where a large propulsive force is required, the vehicle can start smoothly and reliably.

The air actuator used as an element of the start-assist system is liable to break down because the diaphragm, in particular, is made of a flexible material. The air actuator is therefore protected by locating it at the inner side of the vehicle frame and by covering it with the bracket.

The trunnion suspension permits the housing to rotate about the center line of the vehicle axle when the vehicle shaft moves vertically. This rotation causes deviations at the upper support portion and other support portions of the air actuator; however, adverse effects of these deviations can be minimized by locating the air actuator on the drive axle housing 210.

In FIG. 7, a axle-load detector, labelled 600, comprises a leaf spring 610 and a level sensor 650 for detecting a change in position of the center of the leaf spring 610.

The two-rear-axle vehicle has a first rear axle 200 and a second rear axle 300. The first rear axle, nearer to the front axle, comprises the housing 210 containing an axle, and a differential gear case 70, and behaves as a drive axle. The second rear axle 300 has a housing 310 and behaves as an idler axle which does not receive the driving force. It is of course possible to configure the second rear axle 300 to behave as a drive axle.

A front end portion of the leaf spring 610 is supported on a rear portion of the differential gear case 70 of the drive axle 200 via a bracket 620. A rear end portion of the leaf spring 610 is supported on a front portion of the idler axle housing 310 via a bracket 630. A bush 622 is provided between the bracket 620 and the leaf spring 610 to absorb relative twist or other stress between the bracket and the leaf spring. Also the idler axle bracket 630 similarly supports a leaf spring via a bush 632.

The leaf spring 610 supports the lower end of a vertically extending rod 640 at its central portion via mount members 642, 643. The upper end of the rod 640 is coupled to a horizontally extending arm 645 which rotates a axle 652 of the level sensor 650.

The level sensor 650 is fixed to the chassis of the vehicle to electrically detect the amount of rotation of the shaft 652.

When any change occurs in loads applied to the drive axle 200 and the idler axle 300, the suspension deforms by changing the vertical distance between the position of the rod support portion LC of the leaf spring and the position of the level sensor 650. Therefore, by electrically detecting a change in this distance, loads applied to the drive axle 200 and the idler axle 300 can be detected.

Among various types of suspension for two-rear-axle vehicles, there is one in which the inter-axle distance D varies with changes in heights of the axles 200 and 300 from the ground.

If an axle-load detector is used on a vehicle having a suspension of this type, the sensitivity of detecting loads to axles can be improved.

That is, in a suspension where the inter-axle distance D increases with load with respect to that under the unladen status, the distance between the front-end attachment LF and the rear-end attachment LR of the leaf spring 610 increases, and the rod support portion LC rises, bringing the rod 640 upward.

Since the rod 640 rotates the axle 652 of the sensor 650 by the amount of the displacement of the leaf spring 610 plus the vertical displacements of the axles 200 and 300 from the ground, the angle of rotation of the axle 652 becomes large, and the sensitivity is improved.

Figure 8:
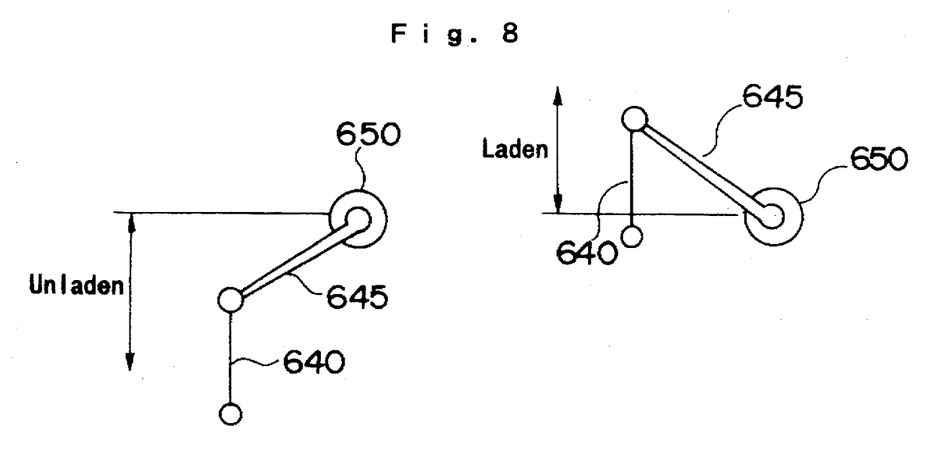
FIG. 8 is an explanatory view of a level sensor.

The sensor 650 varies in its output voltage depending on the position of the arm 645. Thus, as shown in FIG. 8, the system 850 determines that the vehicle is laden when the arm 645 is elevated by the rod 640 beyond a given position, and determines that the vehicle is unladen when the rod 640 remains below the given position.

Figure 9:
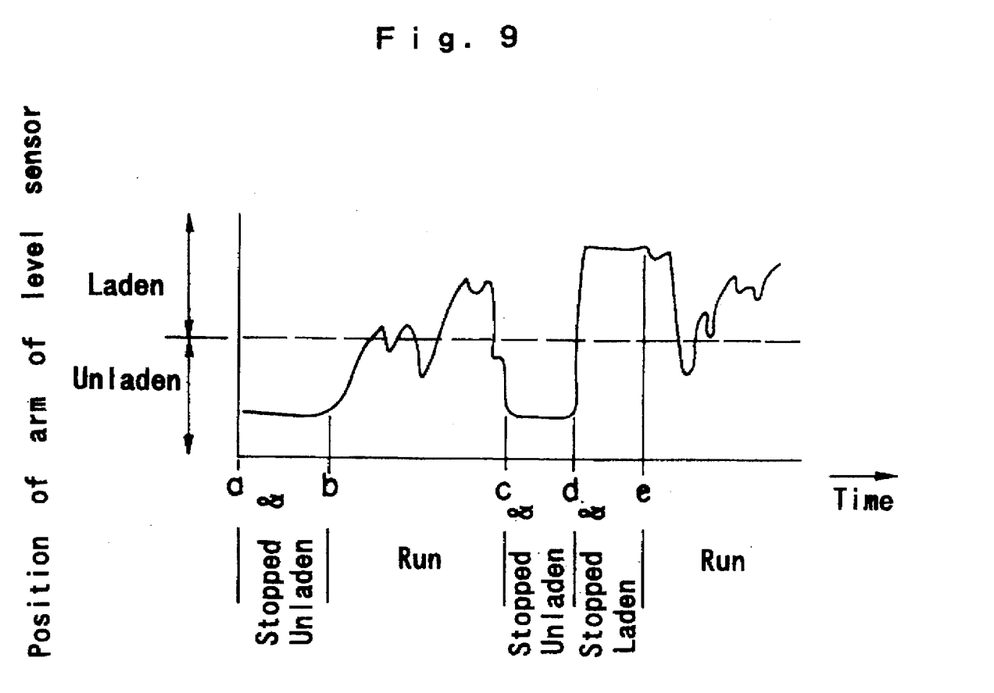
FIG. 9 is an explanatory view of a process of determining, by the level sensor, that the vehicle is stopped.

FIG. 9 shows a typical aspect of activation of the level sensor. The abscissa shows time, and the ordinate shows positions of the arm of the level sensor. Since the output voltage of the sensor varies with the position of the arm as stated above, the ordinate may be regarded as changes in output voltage of the sensor.

In the period of time from a to b which has passed with no change in the position of the arm, CPU 850 (FIG. 1) determines that the vehicle has stopped. In addition, since the position of the arm is in the unladen range, CPU 850 determines that the vehicle lies unladen.

In the period of time from b to c where the position of the arm changes in the given time, CPU 850 determines that the vehicle currently is running. When CPU 850 determines this, the CPU does not determine whether the vehicle is laden or unladen.

When the vehicle stops at the point of time c and is loaded with cargo at the point of time d, the position of the arm of the level sensor enters the laden region, and when a given time passes at that position, CPU 850 determines that the vehicle has stopped and has been laden. After the point of time e, CPU 850 determines from changes in position of the arm that the vehicle currently is running, and does not determine whether it is laden or unladen.

The given period of time for determining whether the vehicle has stopped may be, for example, about 5 to 10 seconds.

Figure 1:
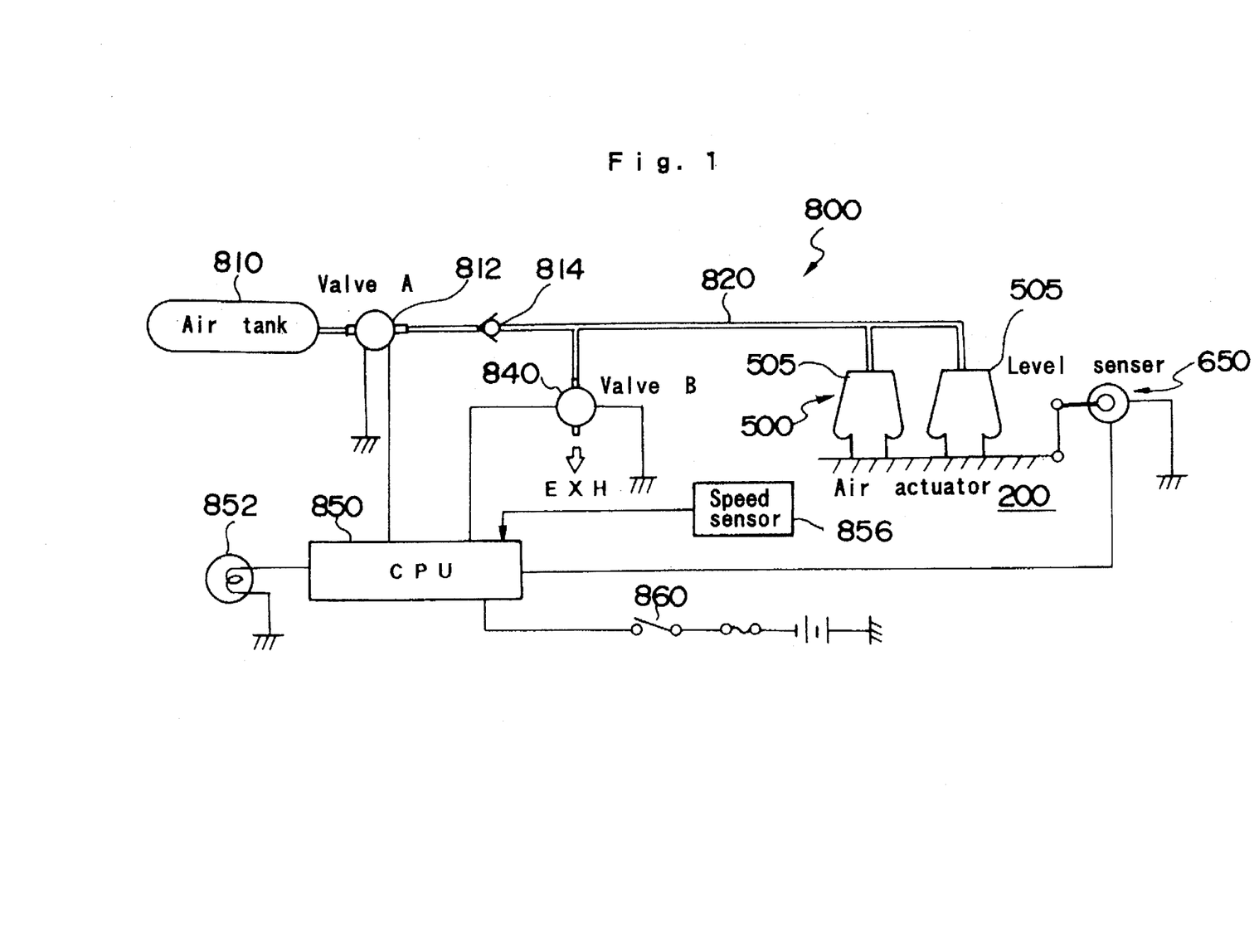
FIG. 1 is an explanatory view of a control device according to a first embodiment of the invention.

FIG. 1 is an explanatory view showing a general aspect of control device according to an embodiment of the invention.

The control device 800 of a start-assist system comprises an air tank 810 containing air which is introduced into the air actuator 505 of the start-assist system 500 through a first control valve (A) 812, a check valve 814 and a conduit 820, and increases the load to the drive axle 200.

CPU 850, used as a control unit, is activated by an actuator switch 860 and receives a signal from the level sensor 650 and a speed sensor 856 to control the first valve (A) 812 and a second valve (B) 840. The first valve 812 controls the supply of air to the conduit 820, and the second valve 840 releases air from the conduit 820.

Figure 2:
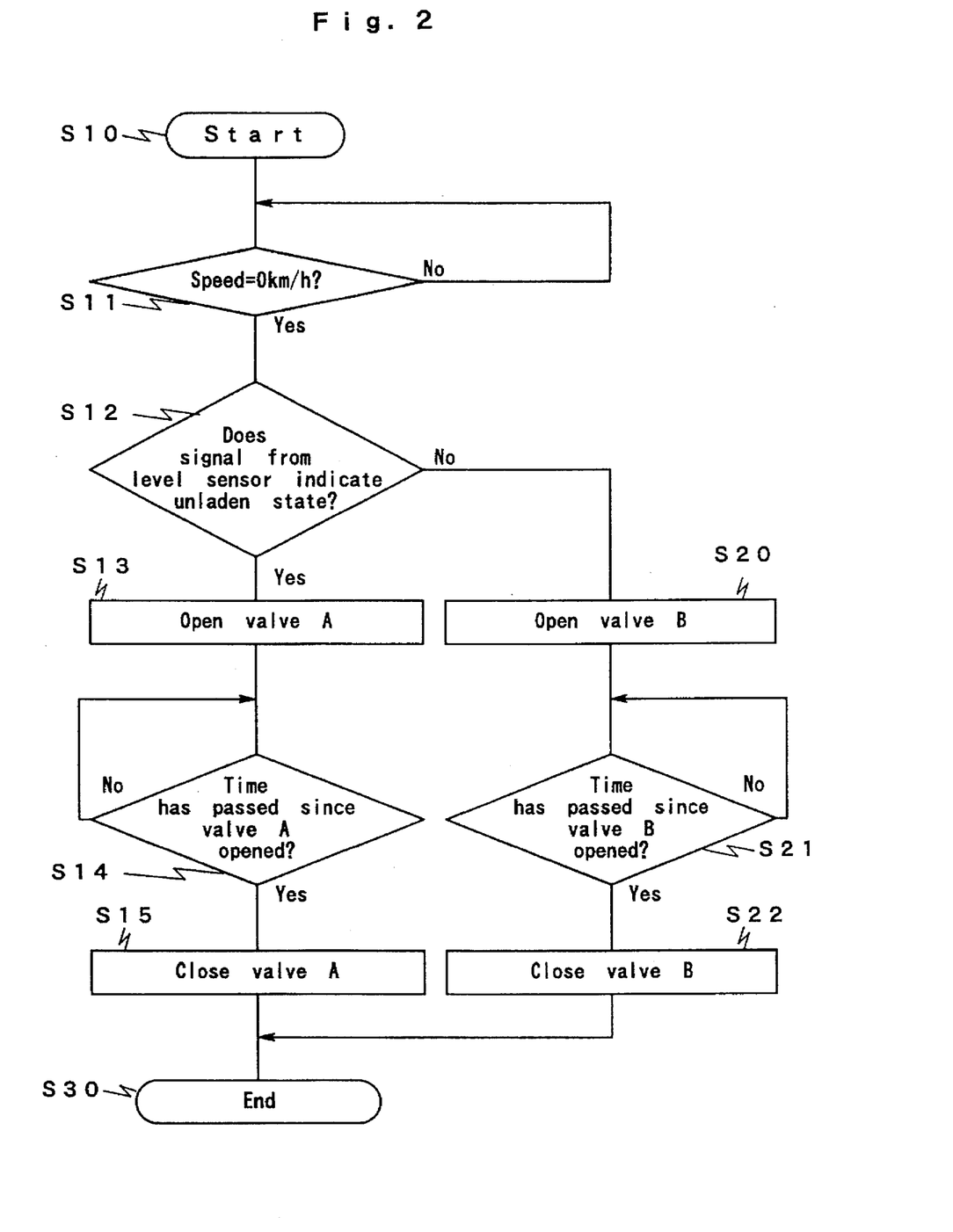
FIG. 2 is a flow chart of the process of control by the control device according to the first embodiment.

FIG. 2 is a flow chart showing the process of control by the control device 800 according to the above embodiment.

The process starts with step S10. In step S11, the speed of the vehicle is detected. If the vehicle is stopped, the process goes to step S12 and detects whether the output signal of the level sensor 650 indicates the unladen condition. If the output signal of the level sensor 650 shows the unladen condition, then the flow proceeds to step S13 and opens the first valve (A) 812 to introduce air into the air actuator 505. In step S14, when it is detected that a given time has passed after the valve (A) 812 is opened, the valve is closed in step S15. Thus, the air actuator expands large enough to make the start-assist system operative, and the flow the process ends.

When it is detected in step S11 that the vehicle is stopped, then the flow proceeds to step S12. If the output of the level sensor indicates the laden condition in step S12, the flow goes to step S20 where the second valve (B) 840 is opened to release air from the air actuator 505. In step S21, when a predetermined time has passed after the valve (B) 840 is opened, the valve is closed in step S22. Thus, the start-assist system is deactivated.

Figure 3:
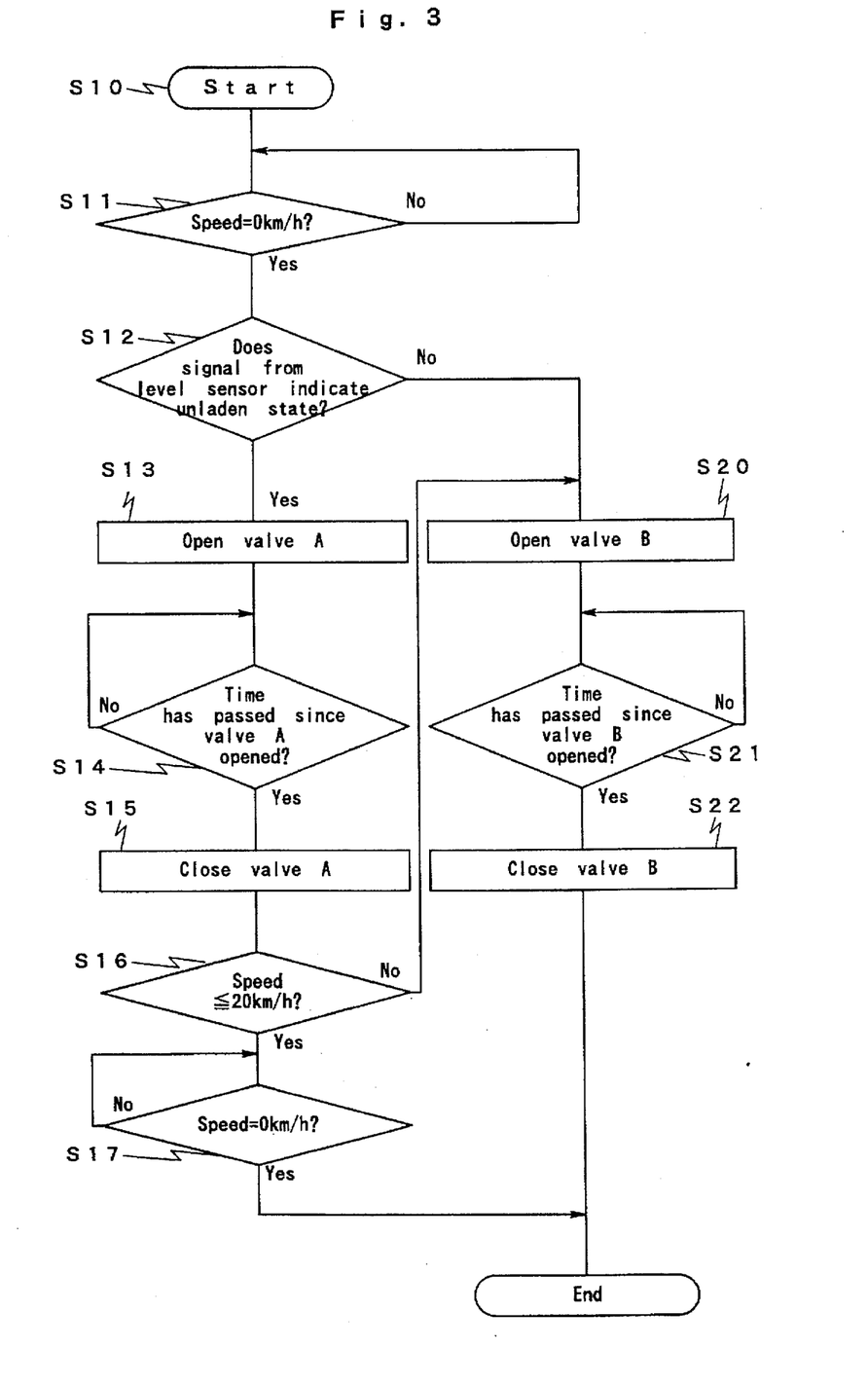
FIG. 3 is a flow chart of the process of control by a modified version of the control device according to the first embodiment.

FIG. 3 is a flow chart showing the process of control by a modified version of the control device 800 according to the same embodiment.

This process of control is substantially the same as the control process shown in the flow chart of FIG. 2 except that the flow goes to step S20 when the speed of the vehicle reaches 20 km/h in step S16 after the first valve (A) 812 is closed, and opens the second valve (B) 840 to release air from the air actuator 505.

According to the above-described embodiment, in a vehicle having two rear axles, one of which behaves as a drive axle, and equipped with the start-assist system which includes the air actuator attached to the drive axle and activated upon starting the vehicle to increase the load the system is automatically activated when detecting that the vehicle is unladen and stopped, whereas it is deactivated when detecting that the vehicle is laden and stopped or when the speed of the vehicle exceeds a predetermined value. Therefore, it is sufficient for the driver to operate the actuator switch, and the system is automatically deactivated when it is not required. Thus the durability of the system is improved.

Figure 11:
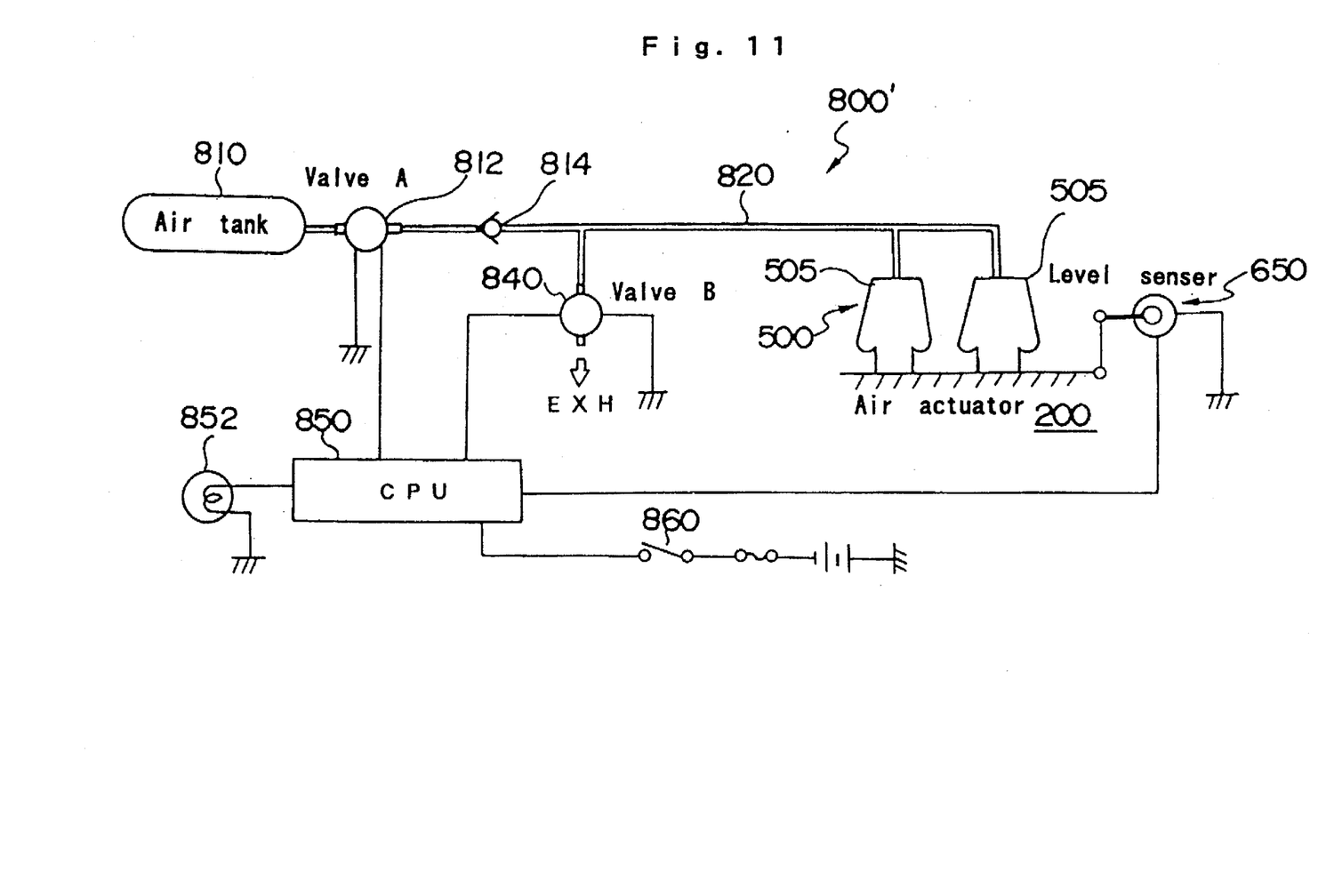
FIG. 11 is an explanatory view of a control device according to a second embodiment of the invention.

FIG. 11 shows an explanatory view showing a general aspect of a control device 800 according to a second embodiment of the invention.

This embodiment is substantially the same as the former embodiment except that CPU 850 does not include a speed sensor 856.

Figure 12:
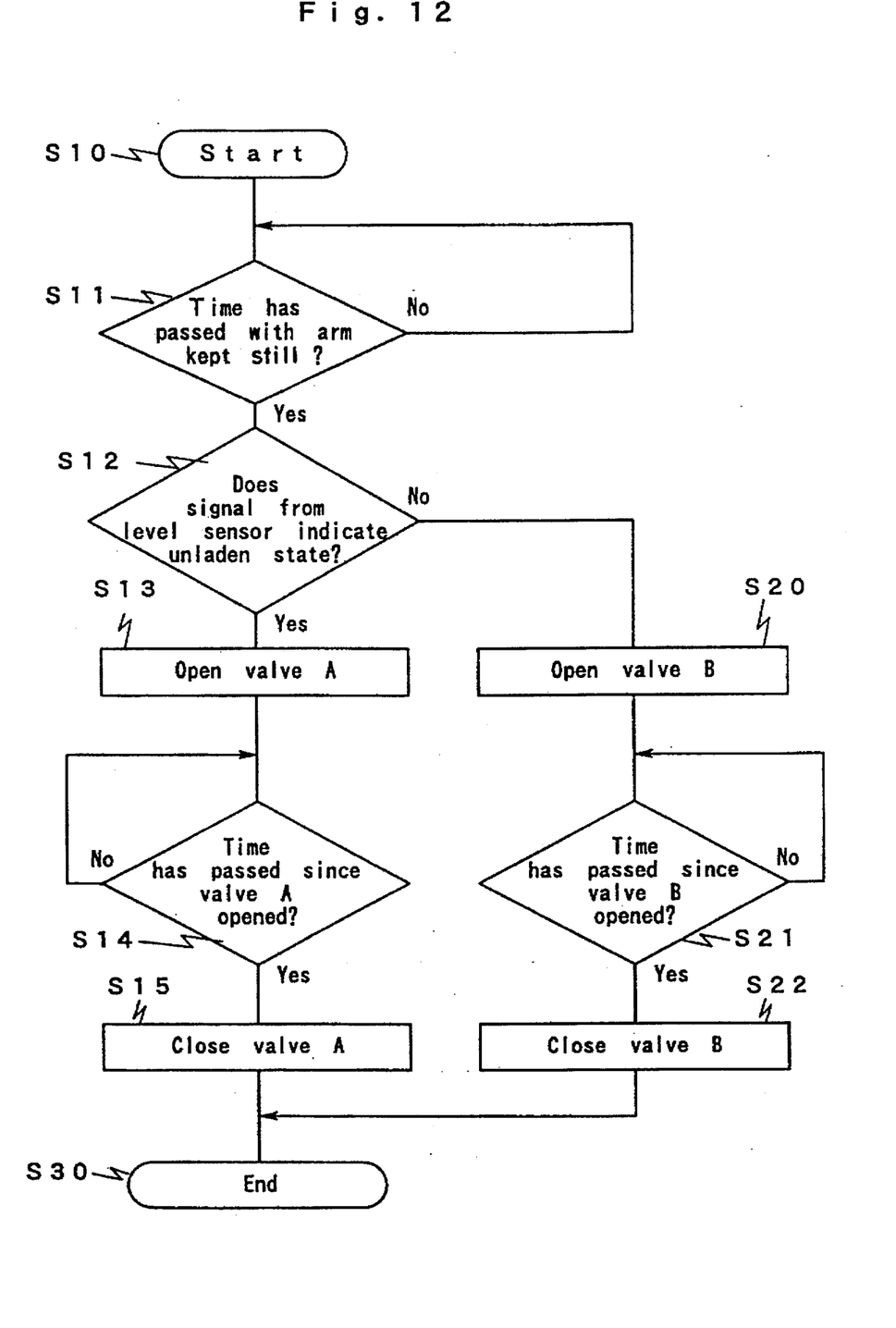
FIG. 12 is a flow chart of the process of control by the control device according to the second embodiment.

FIG. 12 is a flow chart showing the process of control by the control device 800' according to the second embodiment.

The process starts with step S10. In step S11, it is confirmed with a signal from the level sensor 650 whether the predetermined time has passed while the arm of the level sensor 650 keeps the current position. If the time already passes at the position, it is determined that the vehicle has stopped, and the flow proceeds to step S12 to detect whether the output signal from the level sensor 650 indicates the unladen condition. If the output of the level sensor shows the unladen condition, then the process goes to step S13 and opens the first valve (A) 812 to introduce air into the air actuator 505. In step S14, when it is detected that a given time has passed after the valve (A) 812 opened, the valve is closed in step S15. Thus, the air actuator expands large enough to make the start-assist system operative, and flow of the process ends.

In step S11, it is confirmed whether the predetermined time has passed since the arm of the level sensor takes the current position. If the time has passed at the position, it is determined that the vehicle has stopped, and the flow proceeds to step S12. If the output of the level sensor in indicates the laden condition in step S12, the process goes to S20 where the second valve (B) 840 is opened to release air from the air actuator 505. In step S21, when a predetermined time passes after the valve (B) 840 is opened, the valve is closed in step S22. Thus, the start-assist system is deactivated.

According to the second embodiment described above, in a vehicle having two rear axles one of which behaves as a drive axle, and equipped with the start-assist system which includes the air actuator attached to the drive axle and activated upon starting the vehicle to increase the load, the system is automatically activated when detecting that the vehicle is unladen and stopped, whereas it is deactivated when detecting that the vehicle is laden and stopped. Therefore, it is sufficient for the driver to operate the actuator switch, and the system is automatically inactivated when it is not required. Thus the durability of the system is improved.

Moreover, the second embodiment is advantageous also in requiring no additional sensor to detect that the vehicle is stopped.

What is claimed is:

1. A control device for a start-assist system in a vehicle having two rear axles, one of the rear axles being a drive axle and the other of the rear axles being an idler axle, said control device comprising:

an air actuator adapted to be attached to the drive axle to increase the load to drive wheels mounted on the drive axle;

an air supply source for supplying compressed air to said air actuator;

an air conduit having disposed therein a first valve for supplying air to said air actuator and a second valve for releasing air from said air actuator; and a control unit for controlling said first valve and said second valve, said control unit including a valve control for opening said first valve to introduce air to said air actuator in response to a signal indicating that the vehicle is stopped and unladen and for opening said second valve to release air from said air actuator in response to a second signal indicating that the vehicle is stopped and laden.

2. The control device according to claim 1, wherein said control unit further includes a speed sensor for providing a first signal which indicates whether the vehicle is stopped or not stopped and a level sensor for providing a second signal which indicates whether the vehicle is laden or unladen.

3. The control device according to claim 1, wherein said control unit further comprises a level sensor for providing the signal which indicates whether the vehicle is stopped or not stopped and the signal which indicates whether the vehicle is laden or unladen.

* * * * *